Sept. 29, 1942.　　　　D. F. IHLER　　　　2,296,930
INCUBATOR
Filed Jan. 8, 1940　　　4 Sheets-Sheet 1
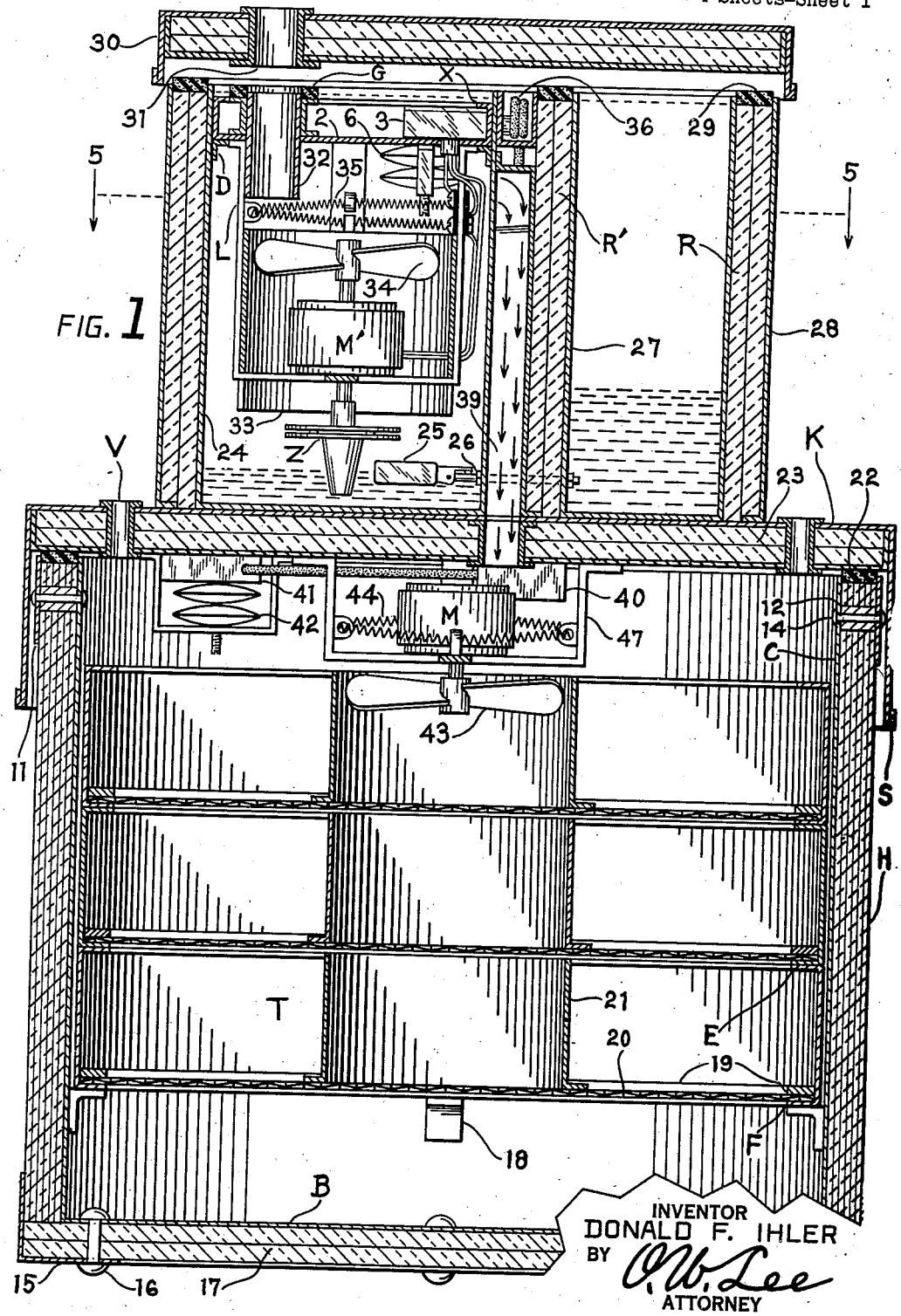

Sept. 29, 1942.　　　D. F. IHLER　　　2,296,930
INCUBATOR
Filed Jan. 8, 1940　　　4 Sheets-Sheet 2
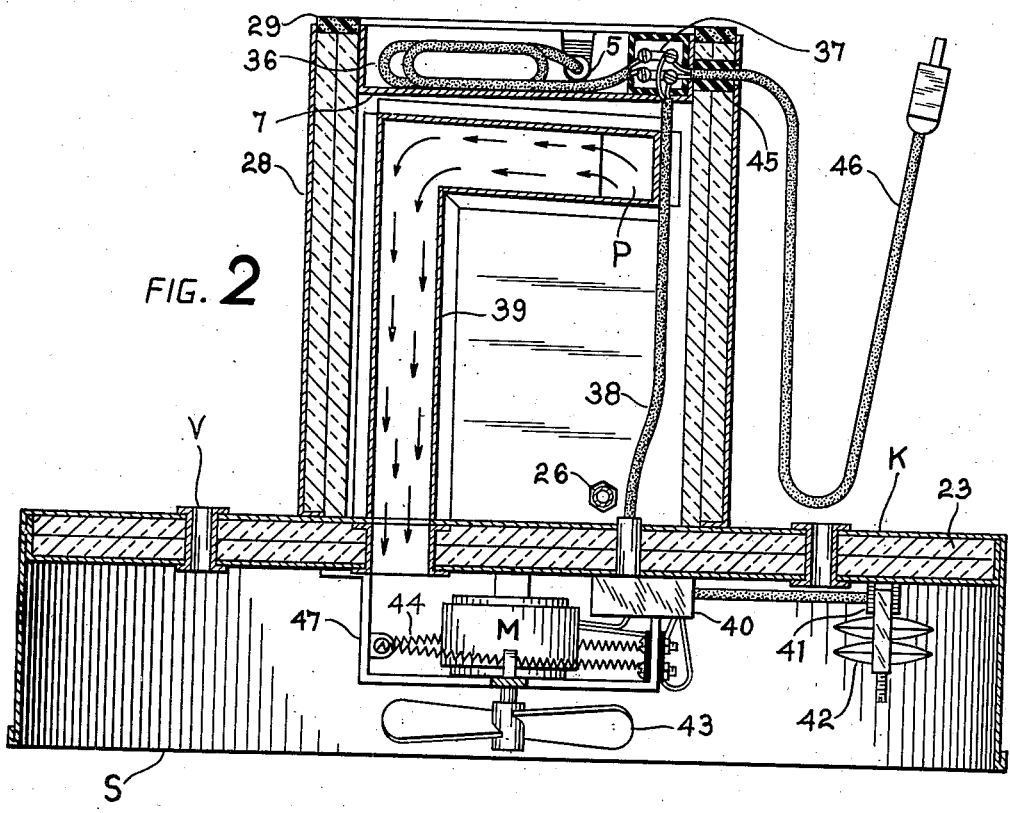
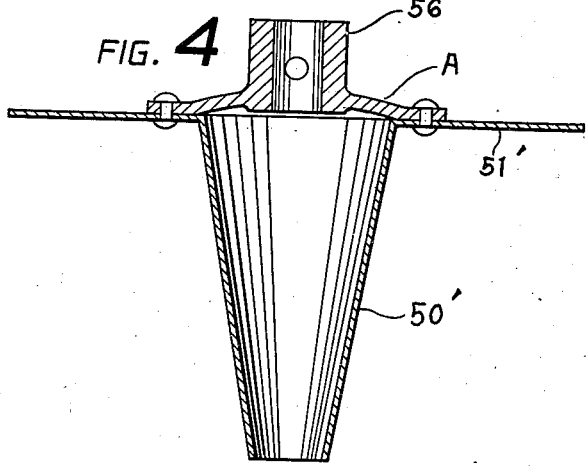
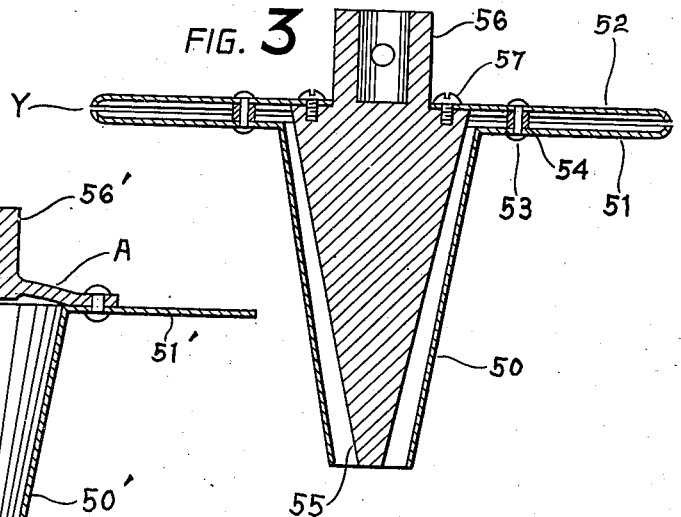
INVENTOR
DONALD F. IHLER
BY O.W.Lee
ATTORNEY Sept. 29, 1942.   D. F. IHLER   2,296,930
INCUBATOR
Filed Jan. 8, 1940   4 Sheets-Sheet 3

INVENTOR
DONALD F. IHLER
BY
ATTORNEY

Sept. 29, 1942.　　　D. F. IHLER　　　2,296,930
INCUBATOR
Filed Jan. 8, 1940　　　4 Sheets-Sheet 4

INVENTOR
DONALD F. IHLER
BY O. W. Lee
ATTORNEY

Patented Sept. 29, 1942

2,296,930

UNITED STATES PATENT OFFICE 2,296,930

INCUBATOR

Donald F. Ihler, Spokane, Wash.

Application January 8, 1940, Serial No. 312,937

14 Claims. (Cl. 119—37)

The present invention relates to improvements in incubators such as are used for the artificial incubation of the eggs of domestic fowl and game birds of various kinds.

The invention is particularly directed to an improved means for continuously supplying the incubator with air and moisture in the correct proportion to afford the desired percentage of relative humidity at incubation temperature.

According to my invention, the air is first preheated to a constant temperature of less than is required for incubation, and this preheated air is completely saturated with all the moisture that it will absorb at the preheated temperature; then this 100 per cent saturated air is passed into the incubation chamber and further heated to the temperature required for successful incubation, which consequently reduces the percentage of relative humidity, according to the difference between the two temperatures.

By preheating the air to a constant temperature and saturating it with moisture, the amount of moisture per pound of air can be accurately controlled by the simple procedure of controlling the preheating temperature. That is to say, that at each different temperature, fully saturated air contains a different weight of water, in accordance with known standards, and that the temperature of the saturated air is an accurate index for the amount of water contained therein. According to my invention, the air is preheated and saturated at such temperature that it will inherently contain the exact amount of moisture necessary to produce the intended percentage of relative humidity when that preheated air is introduced into the incubation chamber and further heated to the higher temperature required for successful incubation.

The invention provides means to assure any desired percentage of relative humidity at any desired temperature of incubation, by the simple procedure of maintaining a proper relationship between the constant temperature of incubation and the constant temperature of preheating for moisture saturation. This improvement eliminates the necessity for humidity control devices and indicators, which are usually vexatious to unskilled users, and makes it possible to provide an incubator which will function with uniformity in unskilled hands.

The elimination of the need for such humidity control devices and indicators, materially reduces the cost of production and makes it possible to provide the small user with an efficient incubator at low cost, and which requires no skill to operate.

The humidifying chamber is entirely separate from the incubation chamber and they are thermally insulated from each other and also thermally insulated from exterior radiation. All air entering the incubation chamber, first enters the humidifying chamber where it is preheated and repeatedly recirculated in a spray of water so as to assure complete saturation, after which the saturated air is conducted into the incubation chamber and further heated to the incubation temperature and repeatedly recirculated and maintained at constant incubation temperature. A portion of the incubator air is constantly discharged so as to compensate for the process of metabolism of the embryo development within the eggs, and this air is constantly replaced by incoming air through the humidifier in the manner aforesaid.

By preheating the air to a constant temperature, the invention avoids the extreme capacity which would otherwise be necessary in the heating element for the incubation chamber in order to suffice for the wide variation in the temperature of incoming air, which would be inevitable in the absence of the preheating of the present invention. Eliminating this extreme capacity of the heating element for the incubation chamber also eliminates the inequalities in the temperature of the circulating air, which inequalities would otherwise be unavoidable until the air in the incubation chamber had been recirculated sufficiently to become of uniform temperature. That is to say that an incubator heating element with sufficient capacity to raise air from zero Fahrenheit to 100 degrees would instantly raise incoming air at summer heat to a temperature far beyond 100 degrees, with the result that true uniformity of temperature in the incubation chamber would be impossible and the temperature would be patchy at each instance of operation of such extreme capacity heating element.

According to my invention any such temporary fluctuations take place in the humidifying chamber where the air is rapidly recirculated in a small space amid a constant spray of water, under which conditions such fluctuations are quickly equalized and the patchy temperature eliminated. Furthermore, the heating element in the humidifier can be made of less capacity as it is never required to heat the air to the temperature of incubation but only to the humidifying temperature. The incoming air being thus preheated to a constant temperature before it enters the incubation chamber, the heating element for the latter may be of small capacity just sufficient to meet the uniform requirement of raising the air from constant humidifying temperature to constant incubation temperature. Thus the objectionable patchy temperatures are effectively eliminated and a more uniform incubation temperature maintained during wide variations in climatic temperatures.

The accompanying drawings illustrate the nature and principle of the invention and show the physical embodiments of two forms which have been reduced to practice.

Fig. 1 is a vertical section through the invention embodied in a round incubator having a removable cover upon which the humidifier is mounted.

Fig. 2 is a vertical section of the removable cover, disclosing the air conduit leading from the humidifier to the inside of the cover, the lid for the humidifier being omitted for the convenience of illustration.

Fig. 3 shows the preferred form of water spray device.

Fig. 4 shows a well known form of water spray device.

Figure 7:
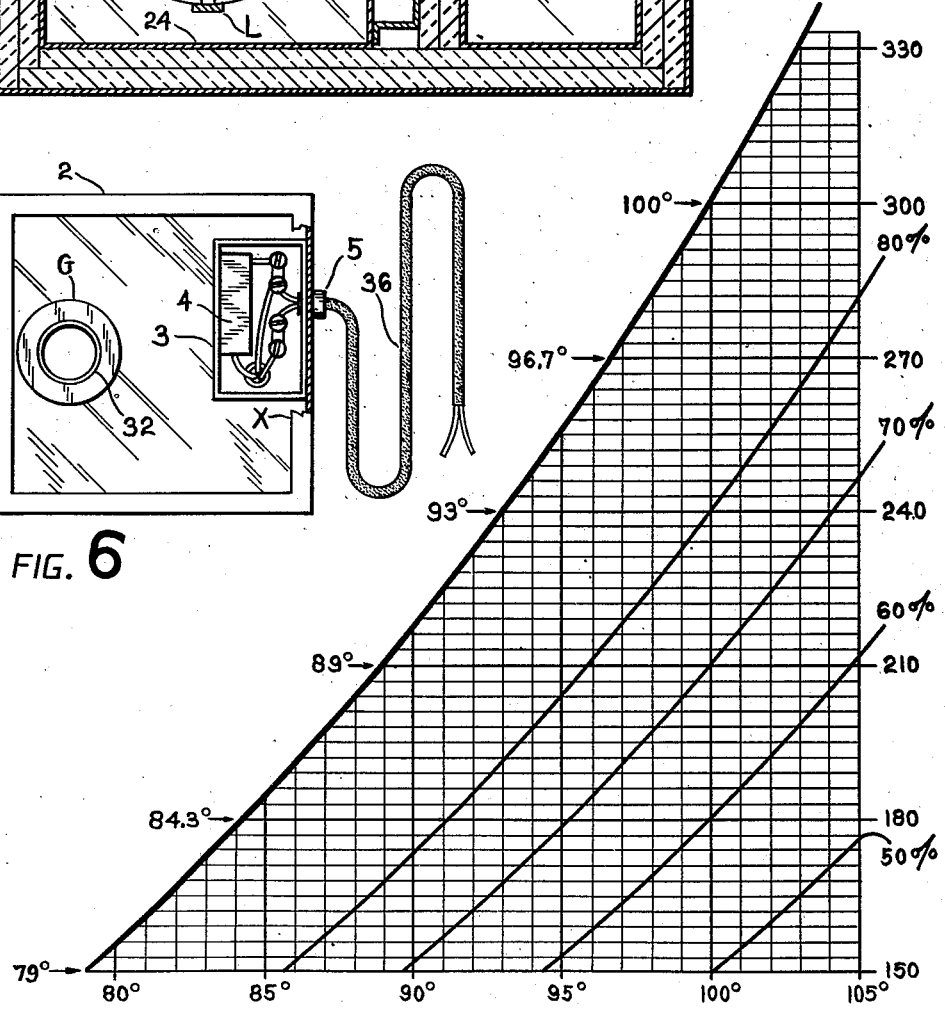

Fig. 7 shows a graph indicating various percentages of humidity at various temperatures, and the weight of water in grains per pound of dry air. The vertical lines indicate Fahrenheit temperatures and are labeled in five degree intervals at the bottom of the chart. The horizontal lines indicate grains of water per pound of dry air, each division representing three grains and each ten divisions being labeled for total grains. The various curves indicate percentages of relative humidity as labeled.

Figures 8, 9:
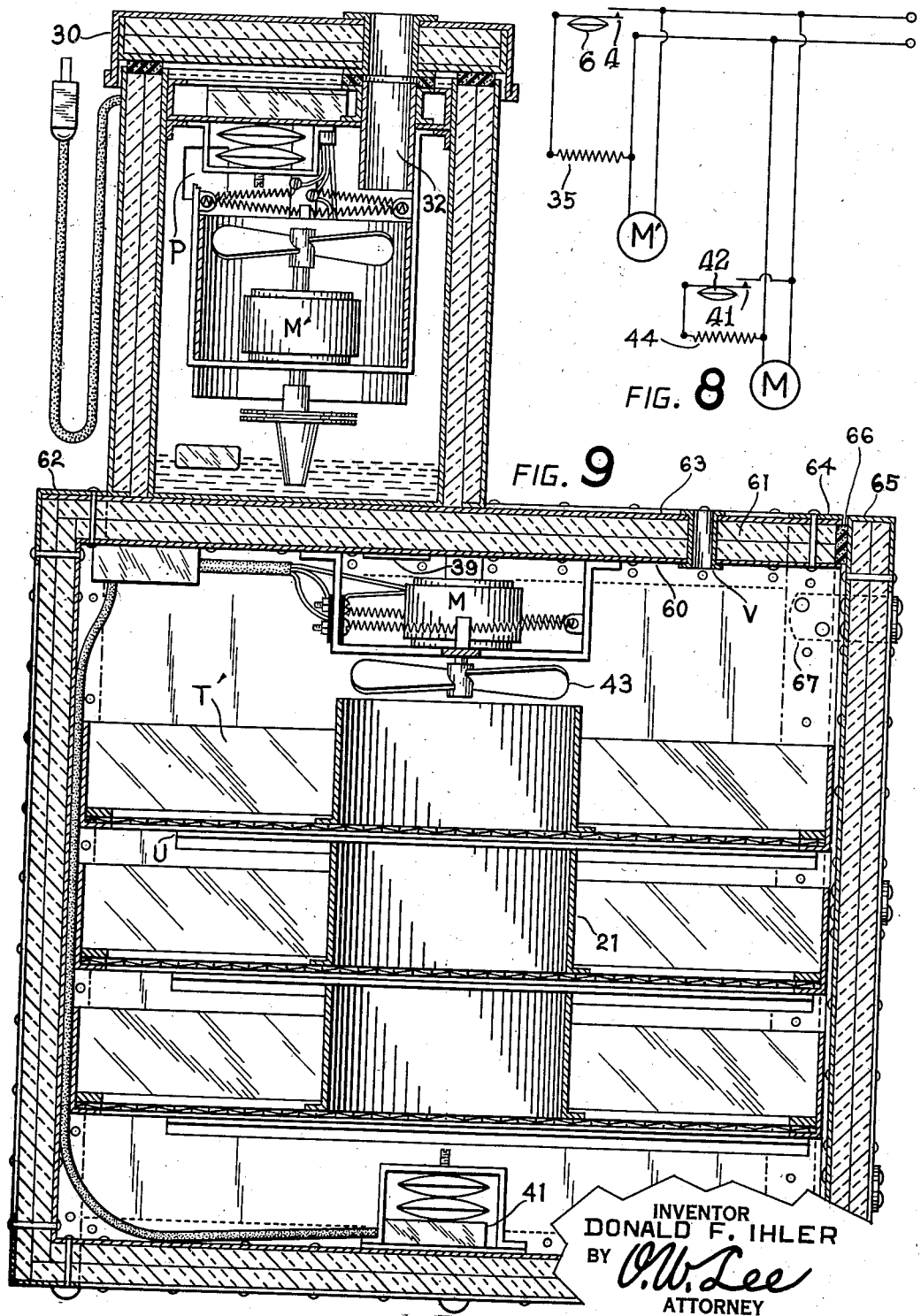

Fig. 8 shows a diagram of the electrical wiring for the invention.

Fig. 9 is a vertical section of the invention when a rectangular incubator is employed.

To illustrate the general utility of my invention for use by those who raise poultry on a small scale, I have disclosed an incubator having a capacity for about 300 eggs and so constructed that it can be produced at a modest cost which the small used can readily afford.

As shown in Fig. 1, the round incubation chamber is made with a sheet metal lining C around which there is applied a suitable thickness of heat insulating material H here indicated as six layers of corrugated paper. It is conveniently practical to wind this corrugated paper in a continuous strip around the sheet metal incubator, until the desired thickness is obtained and then secure the terminal end in any appropriate manner, preferably with a suitable adhesive. If desired, this insulation may be finished by applying a decorative paper, the well known washable wall paper being very serviceable and readily applied in the well known manner. The underside of the bottom B is thermally insulated, as for instance, I have indicated two layers of wood pulp sheets 17. A bottom cap 15 is fitted over the insulation and held in place in any suitable manner such as by rivets 16. Preferably the top of the corrugated paper is protected by a metal band 11 here shown as held in place by rivets 14 provided with spacer blocks 12. A suitable gasket 22 is provided and preferably this is of sponge rubber as that material is readily available in strips of suitable width and at low cost. This gasket may be secured to the corrugated paper by any well known cement. As here shown, it is advisable that the corrugated paper terminate slightly below the inner and outer sheet metal parts so that they will provide guides forming a circular channel for quick and accurate positioning of the cement and the sponge rubber strip upon the round incubator.

Seating upon this circular gasket 22 is a removable cover K which is thermally insulated as indicated at 23. Mounted upon this cover K is the humidifier which consists of a tank 24 provided with suitable means to maintain a constant water level, preferably by a float 25 controlling the flow through a pipe 26 which leads to a water reservoir 27. As indicated at R and R' this reservoir and the humidifying chamber are thermally insulated on their exteriors and also from each other, preferably by double layers of wood pulp sheets which are held in position by an outer sheet metal casing 28 which is secured to the cover K in any suitable manner such as by soldering or riveting. Each insulated wall is provided with a gasket such as 29 which is preferably of sponge rubber suitably cemented thereto, and as here indicated, the supporting sheet metal parts should extend slightly above the insulation to provide guide channels for quick and accurate positioning of the cement and the sponge rubber strips. Seating upon these gaskets is a thermally insulated lid 30 having an air inlet tube 31.

Within the humidifying chamber are brackets D which support a removable humidifying unit which is mounted on a closure 2 which has an air inlet tube 32 communicating with the tube 31 in the lid 30, a gasket G being positioned between these two tubes. A small mesh screen may be employed to prevent small insects from entering through these tubes but this common expedient is not here shown as it may be merely laid upon the gasket G where it can be conveniently removed as often as necessary for discarding the accumulation of insects.

This closure 2 is preferably an open box with internal flanges X to provide rigidity and to afford convenient finger grasp without the necessity of providing lifting handles. Secured to the underside of the closure are brackets L which support a sleeve 33 at spaced distances from the closure 2 and from the bottom of the tank 24. Mounted within this sleeve is an electric motor M' driving a fan 34 and also turning a water spray device such as Z. This water spray device may be of any suitable form, as for instance in Fig. 4 there is shown the well known hollow cone 50' with a flange 51' connected to arms such as A which extend from the hub 56'. As is well known, this flanged hollow cone operates by centrifugal force and causes water to rise on the inner surface of the cone and to pass out horizontally over the upper surface of the flange.

The preferred form of spray device is shown in Fig. 3 where the hollow cone 50 carries a cupped flange 51 which cooperates with a mating cupped disc 52 which is secured thereto as indicated at 53 and held in spaced relation by bushings 54 so as to provide a narrow peripheral slit Y for accurate control of the escape of water. To provide further accuracy of control of the water, there is secured to the under side of the top disc 52 a cone 55 which is held in spaced relation with the outer cone 50 thus controlling the rise of water in the outer cone and also lessening the gravity back-drop which would otherwise exist in the absence of the capillary attraction afforded by the closely spaced surfaces of the two cones. Preferably the inner cone 55 has a greater taper than the outer cone 50 and the relationship should be such as to compensate for the increasing diameter of the outer cone. That is to say, the open area at the top of the outer cone should not be greater than the open area at the lower portion. This arrangement affords constant regularity of the rise of water by centrifugal force, and eliminates the surge which would otherwise occur. As here shown the inner cone 55 is solid and integral with the hub 56 and may be secured to the top disc in any suitable manner as for instance by screws 57; and if desired the inner cone 55 may be hollow with the lower end closed to exclude water. With this improved construction the peripheral slit Y can be made very narrow and of even regularity so as to produce an exceptionally even spray of water in the form of a very fine mist, which is of particular advantage where complete moisture saturation of air is desired.

If desired, this inner cone 55 may be omitted from the showing of Fig. 3 and the hub 56 attached to the upper disc 52 in any suitable manner, thus depending solely upon the peripheral slit Y for regularity of the water spray. Fig. 1 shows a similar spray device Z where the flange is flat and the mating disc is also flat and held in spaced relation as indicated, otherwise the structure is the same as shown in Fig. 3 and may be either with or without the described inner cone. Flat discs such as shown in Fig. 1 afford a reasonably fine spray but are more liable to become distorted and thus lose their efficiency.

Figure 5:
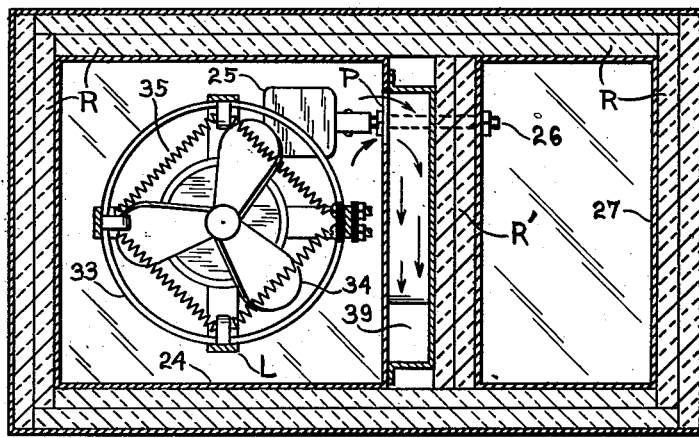
Fig. 5 shows a horizontal section of the humidifier taken on the line 5—5 of Fig. 1.

Either of the described forms of spray devices may be installed as shown at Z in Fig. 1 which places them in the air path of the fan 34 so that the water spray will be carried upward in the space between the sleeve 33 and the walls of the tank 24 where it will then be drawn down through the fan 34 in such manner that the air and moisture are in constant recirculation downward in the sleeve and upward outside the sleeve to again return downward through the sleeve. During each circuit the air and moisture pass over the heating element 35 which is suitably positioned as indicated in Fig. 1 and Fig. 5, and thermostatically controlled as indicated by the bellows 6 operating a switch 4 within the box 3 best seen in Fig. 6. By controlling the operation of the heating element 35 the recirculating air and moisture in the humidifier can be maintained at constant temperature, and the repeated recirculation affords adequate time to assure complete moisture saturation of the air entering through the tube 32 which is positioned sufficiently near to the fan 34 to assure the proper amount of draft.

Figure 6:
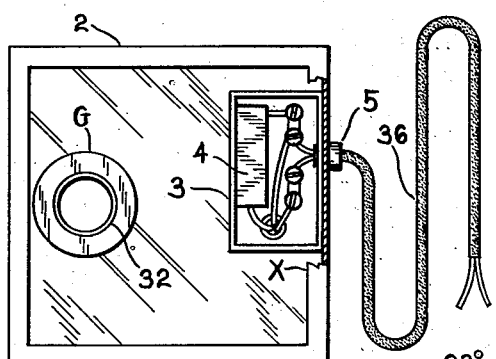
Fig. 6 is a plan view of the removable humidifying unit.

From this description it will be seen that all of the humidifying elements are carried by the removable closure 2 and can be quickly and easily lifted out as a unit when required for any purpose such as inspection and repairs and for occasional cleaning of the tank 24, a suitable length of electrical cord 36 being provided for that purpose. As shown in Fig. 2 the electrical cord 36 connects to the terminals 37 and passes through the nipple 5 into the box 3 shown in Fig. 6. One side of the line is connected through the thermostatically controlled switch 4 to the heating element 35, and this same side of the line is directly connected to the motor M'; the opposite side of the line is connected to the heating element 35 and also to the motor M' as illustrated in Figures 1, 6 and 8. Thus it will be seen that this provides for continues operation of the motor M' and intermittent operation of the heating element 35.

As best seen in Fig. 2 there is connected to these same terminals 37 an electrical conduit 38 which passes down to the box 40 from which one side of the line is connected through the thermostatically controlled switch 41 to the heating element 44, and this same side of the line is directly connected to the motor M. The opposite side of the line is connected to the heating element 44 and to the motor M as illustrated in Fig. 2 and Fig. 8. Thus it will be seen that this provides for continuous operation of the motor M and intermittent operation of the heating element 44.

The motor M with the fan 43 is centrally mounted on the under side of the removable cover K by brackets 47 which also support the heating element 44 electrically insulated in the required manner. The switch 41 is secured in any appropriate location on the under side of the cover K and a thermostat control is provided as indicated by the bellows 42. This removable cover K is provided with a skirt S which extends downwardly a sufficient amount to support the fan 43 free of any plane surface upon which the cover K may be placed when removed from the incubator in the intended manner.

From Figs. 1, 2 and 5 it will be seen that an air conduit 39 leads from a port P in the humidifier chamber and discharges immediately above the heating element 44. Preferably, this conduit is placed between the humidifier tank 24 and the water reservoir 27 and heat insulated from the latter as indicated at R' in Fig. 5 and Fig. 1. The transverse portion of this conduit may be inclined downwards towards the port P to afford drainage should any water enter this conduit. However, it should be mentioned that the recirculation effected by the fan 34 keeps the globules of water moving in a direction opposite to the port P and that the more remote position of the fan 43 does not give it sufficient draw to change the direction of these oppositely moving globules of water and therefore little or no water enters the port P, consequently the inclined portion of the conduit 39 can be omitted if desired.

It will be seen that the port P is sufficiently below the top of the humidifier tank 24 to provide room for the tray 7 which affords convenient storage space for the electrical cord 36. The wall of this tray 7 and the adjacent wall of the humidifier tank 24 are notched out to admit the nipple 5 which extends from the box 3 in the removable closure 2, so that the latter can be removed and replaced as often as occasion requires and without abrasion of the cord 36. It will also be seen that the terminals 37 are suitably mounted in this tray 7 from which the extension cord 46 passes out through the wall which is provided with a bushing 45.

From the foregoing description it will be seen that the entire mechanism for the incubation chamber and for the humidifier are carried by the removable cover K and can be readily removed as indicated in Fig. 2. Also, the humidifying mechanism is carried by the removable closure 2 and can with facility be manually removed as a unit within the range of the cord 36; and when desired for any reason, the cord 36 can be disconnected as indicated in Fig. 6. This structure and arrangement affords convenience in assembling and materially reduces the cost of manufacture, and also facilitates disassembling and reassembling when required for repairs or replacements.

Referring again to Fig. 1 where the egg trays such as T are shown in the incubation chamber, the bottom tray is supported at a spaced distance above the floor of the incubator, brackets such as 18 being shown in the present instance, however these may be united into a ring bracket if desired. With the bottom tray thus supported, other trays may be added, each seating on the tray therebelow, three being shown in the present instance. These trays have screen bottoms 20 for passage of the air, and I have shown the screen as secured to a ring 19. It is conveniently practical to stretch the screen upon the ring and secure them together by welding or soldering, after which the screen can be trimmed close to the ring and then be either plated or galvanized. The annular side wall of each tray is shown with inwardly turned flanges E and F at the top and bottom, and these preclude escape of the ring 19 thus making it unnecessary to secure the latter. It will of course be understood that the ring 19 is inserted before the ends of the side wall are joined to form the circular tray.

Centrally mounted upon the screen 20 of each tray is a sleeve 21. These sleeves form a central flue for the downward path of the air current from the fan 43, and the air current then spreads out over the floor of the incubation chamber and passes up through the screen bottoms of the egg trays to the top of the incubation chamber where it is again drawn into the fan 43 and recirculated downward in a continuous circuit repeatedly coming in contact with the heating element 44 at each recirculation. This heating element being thermostatically controlled, the circulating air in the incubation chamber is maintained at constant temperature.

A gradual escape of air is afforded through a suitable number of exhaust ducts such as V and this air is constantly replaced by incoming humidified air through the conduit 39 which is positioned immediately above the heating element 44.

In the operation of the invention, constant humidity and constant incubation temperature are maintained without skill or ability on the part of the operator.

Extensive experiments and experience have proven that a relative humidity of 60 per cent at a temperature of 100 degrees Fahrenheit is the optimum for incubation of the eggs of domestic chickens. It is well known that 300 grains of water are required to completely saturate one pound of dry air at a temperature of 100 degrees Fahrenheit, and the 100% curve in Fig. 7 is made to show this fact. Plainly, 60 per cent relative humidity at a temperature of 100 degrees would require 180 grains of water per pound of dry air, and this is indicated by the 60% curve in Fig. 7 where this curve intersects the 100° line at the 180 grain line. It is well known that 180 grains of water will completely saturate one pound of dry air at a temperature of 84.3 degrees, and this fact is indicated by the 100% curve in Fig. 7. Then plainly, when air at a temperature of 84.3 degrees is completely saturated with moisture, it contains 180 grains of water per pound of dry air, and when this completely saturated air is subsequently heated to 100 degrees there is assured a relative humidity of 60 per cent.

As an example of the practice of my invention the thermostat 6 is set to maintain a constant temperature of 84.3 degrees, and the air in the humidifier is constantly recirculated in a spray of water so as to assure complete saturation. This completely saturated air then passes through the air conduit 39 into the incubation chamber where the thermostat 42 is set to maintain a constant temperature of 100 degrees, thus as the temperature is increased to 100 degrees, the relative humidity is reduced to 60 per cent. The air which gradually escapes through the exhaust ducts V is constantly replaced by air from the humidifier, hence the incubator is provided with a constant flow of air which is maintained at 100 degrees temperature and 60 per cent relative humidity, and this air is repeatedly recirculated upwardly between the eggs which are placed in the trays T which are arranged in a column.

It is well known that incubating eggs give off moisture, and that the amount gradually increases up to the time of hatching, at which period there is an abrupt increase in the amount of liberated moisture due to the chicks emerging from the shells. It is conveniently practical to make the exhaust ducts V of whatever capacity that is necessary to discharge sufficient air to dissipate the moisture given off during incubation by whatever number of eggs the trays accommodate. That is to say that there may be as many exhaust ducts as required, depending upon their diameter. Proper volume of exhaust being provided to discharge the liberated moisture up to the time of hatching, will also fully suffice to discharge the carbon dioxide liberated by the incubating eggs, and the replacement of this exhaust by incoming air will also fully suffice to supply the required oxygen for efficient incubation. Thus by providing for proper exhaust, the user is relieved of the necessity to attend to any such details or to make inspections, determinations and regulations for such purposes. It should be noted that no amount of exhaust can possibly reduce the relative humidity below the aforesaid setting of 60 per cent and therefore no consideration need be given to the fact that the eggs give off but little moisture during the first few days of incubation. It should also be noted that air from the incubation chamber is never returned to the humidifier, and therefore, accumulation of carbon dioxide is effectively prevented.

In the present instance the egg trays are shown of sufficient depth to accommodate hatching in the trays. When the time of hatching arrives, the opening of the shells by the chicks will liberate an increased amount of moisture fully adequate to supply sufficient humidity without the moisture previously supplied through the humidifier, in which case it is a simple matter to cease supplying moisture, as for instance, by either blocking the float 25 or else by emptying the water in the humidifier and reservoir, and continuing the operation of the fan 34 and heating element 35 as well as those of the incubation chamber.

Where a separate hatching compartment is employed, the egg trays need be only deep enough to accommodate the eggs, as that makes it possible to incubate a larger quantity of eggs without increasing the size of the incubation chamber.

The described round incubation chamber affords economy in manufacture, but if desired, the same principles may be embodied in a rectangular incubation chamber having a removable cover complementary thereto, and otherwise essentially the same as hereinbefore described.

In Fig. 9, I have shown a rectangular incubation chamber wherein the egg trays T' slide like drawers on runners U, and a hinged door is provided for access to the egg trays. As here shown the structure is essentially the same as previously described except that the thermostatically controlled switch 41 is placed on the floor of the incubator and in the direct path of the fan 43. It will also be seen that the humidifier is placed rearwardly on the incubator, as is conveniently practical and also desirable. The electrical circuit is the same as shown in Fig. 8 and previously described. For the convenience of illustration the side walls of the egg trays are shown reduced in height but with the trays spaced apart the same distance as in Fig. 1 and with the sleeves 21 forming an air flue through the column of egg trays. For convenience of illustration the inlet tube 32 is shifted in position so as to bring it in the line of section.

This rectangular incubator is shown with a sheet metal lining 60 externally insulated on each of its five sides by a double thickness of wood fiber sheets such as 61 which are held in position by saddle corners such as 62 which are riveted to the lining 60. A sheet metal top 63 is inserted under the saddle corners and also bound by the strip 64 which is similarly riveted. The insulated door 65 is suitably hinged to the incubator as indicated at 67, and a gasket such as 66 extends around the four edges of the incubator walls abutting this door. This door may be held closed by any suitable latch, and therefore this common expedient is not shown.

It will be noted that this construction leaves the heat insulating material exposed on all sides of the incubation chamber except the top, and it is conveniently practical to finish each of these exposed surfaces with a sheet of washable wall paper applied thereto before assembling, as this provides a satisfactory coating at low cost.

The invention has been disclosed with reference to small capacity incubators, but obviously it is also applicable to incubators of large capacity and the operation may be by staged incubation, equally as well as by single setting. The egg trays may be of any known kind and either with or without egg turners. I have shown the air flue for recirculation as centrally located, however it may be located at one side of the incubation chamber, and the other essential elements arranged accordingly, as that is the original form in which the invention was reduced to practice in a rectangular incubator.

My improved method of controlling the percentage of relative humidity at incubation temperature, is equally applicable to various forms of incubators and various forms of humidifying devices, so long as complete moisture saturation is accomplished at the proper temperature of preheating corresponding to the incubation temperature employed and according to the percentage of relative humidity desired. The various relationships of complete saturation temperatures to percentage of relative humidity at higher temperatures are clearly shown in the graphic chart of Fig. 7 as will be well understood by those skilled in the art.

In actual practice the manufacturer makes the incubator to operate at a specified temperature and specified percentage of relative humidity and with the proper amount of exhaust, thereby relieving the user from making any adjustments. Should it be considered desirable to utilize any different temperature for incubation or any different percentage of relative humidity, as for instance, when required by the eggs of some particular kind of fowl, it is a simple matter to provide the user with printed information stating the proper humidifying temperature and the proper temperature for incubation to be used for each particular kind of eggs. Then it is a simple matter for the user to set the thermostats 6 and 42 each at the particular temperatures stated, using a standard thermometer as a guide, a dry bulb temperature being used in each instance, because there would be no difference between wet and dry bulb temperatures in the humidifier, and there is no need to determine the wet bulb temperature in the incubation chamber, for the reason that the intended relative humidity is already assured by the stated temperatures at which the thermostats 6 and 42 are to be set. This relieves the user of all of the vexations of taking wet and dry bulb temperatures and also eliminates the inaccuracies which are so frequently due to inadequate equipment and faulty technique on the part of the user who is usually not proficient in such matters nor thoroughly familiar with the significance of wet and dry bulb temperatures.

In the foregoing description the term temperature of incubation is intended to mean the temperature of the air in the incubation chamber, as distinguished from the temperature of the eggs. That is to say, that in the later stages of incubation the eggs inherently acquire a higher temperature than the surrounding air in the incubation chamber and that it is not only unnecessary but detrimental to increase the temperature of the air to that of the eggs, as such would preclude the eggs from maintaining their inherent temperature by liberation of heat in the natural manner.

In the present disclosure, I claim as my invention:

1. In an incubator having means for supporting eggs and means for recirculating air repeatedly between the eggs and means to maintain such air at constant temperature for incubation and means for gradually venting such air; a thermally insulated tank communicating with said incubator and thermally insulated therefrom, means to control a water level in said tank, an upright sleeve supported entirely within said tank, a motor driven fan operating in said sleeve, a water spray device operating in the blow path of said fan, a thermally insulated lid for said tank, means to maintain said tank at a constant temperature sufficiently below that of the aforesaid constant temperature for incubation to provide saturated air containing the required weight of water to produce a predetermined percentage of relative humidity when raised to the aforesaid constant temperature for incubation, and an inlet tube for admitting air to said tank.

2. In an incubator having means for supporting eggs and means for recirculating air repeatedly between the eggs and means to maintain such air at constant temperature for incubation and means for gradually venting such air; a thermally insulated humidifier communicating with said incubator and thermally insulated therefrom, means to produce a constant flow of fresh air first through said humidifier and then into said incubator, means to maintain a constantly uniform spray of free moisture within said humidifier, means to produce repeated recirculations of the air and free moisture within said humidifier at a speed in excess of the flow into said incubation chamber, and means to repeatedly reheat the circulating moisture and air to a predetermined constant temperature during the recirculations within said humidifier.

3. An incubator comprising a thermally insulated incubation chamber, screen bottomed egg trays supported in a column within said incubation chamber, each of said trays having an upright sleeve centrally mounted thereon, said sleeves forming an air flue, a motor driven fan directed towards said flue, a thermostatically controlled heating element mounted within said incubation chamber, a thermally insulated tank communicating with said incubation chamber and thermally insulated therefrom, means for controlling a water level in said tank, an upright sleeve supported entirely within said tank, a fan operating in said sleeve, a water spray device operating in the blow path of the latter fan, a motor driving the latter fan and said water spray device, a thermostatically controlled heating element mounted within said tank, an air inlet tube in said tank, and exhaust ducts in said incubation chamber.

4. An incubator comprising an incubation chamber, means to maintain the air in said incubation chamber at constant temperature for incubation, a humidifier communicating with said incubation chamber, a heating element within said humidifier, a thermostat within said humidifier and controlling said heating element, means to maintain a constantly uniform spray of moisture within said humidifier, means to recirculate the moisture spray and air repeatedly in contact with said thermostat and said heating element to maintain the air in said humidifier completely saturated with moisture and at a constant temperature sufficiently below the aforesaid temperature for incubation to assure that the saturated air passing from said humidifier to said incubation chamber will contain the required weight of water to produce a predetermined percentage of relative humidity when raised to the aforesaid constant temperature for incubation, an air inlet tube in said humidifier, exhaust ducts in said insubation chamber, and means to produce a constant flow of air from said humidifier into said incubation chamber.

5. In an incubator having means for supporting eggs and means for recirculating air repeatedly between the eggs and means to maintain such air at constant temperature for incubation and means for gradually venting such air; a thermally insulated tank communicating with said incubator and thermally insulated therefrom, means to control a water level in said tank, a removable closure for said tank, a humidifier unit carried by said removable closure and within said tank, said humidifier unit embodying a water spray device and means to repeatedly recirculate the air within said tank and means to maintain such air at a constant temperature, and an air inlet tube in said closure.

6. An incubator comprising an incubation chamber, a cover removably seating upon said incubation chamber, a motor driven fan mounted on the underside of said cover, a skirt depending from said cover and extending below the plane of said fan, a thermostatically controlled heating element mounted near said fan, a humidifier mounted on the exterior of said cover, an air conduit leading from said humidifier and passing through said cover, and means to assure a constant flow of air from said humidifier into said incubation chamber.

7. An incubator comprising a thermally insulated incubation chamber, a thermally insulated cover removably seating upon said incubation chamber, a motor driven fan mounted on the underside of said cover, a skirt depending from said cover and extending below the plane of said fan, a thermostatically controlled heating element mounted near said fan, a humidifier tank mounted on the exterior of said cover, an air conduit leading from said humidifier tank and passing through said cover, thermal insulation around said humidifier tank and conduit, a removable closure for said tank, brackets depending from said closure, a sleeve carried by said brackets, a motor mounted in said sleeve, a fan turned by the latter motor, a water spray device turned by the latter motor and mounted in the blow path of said fan, a thermostatically controlled heating element carried by said closure, an air inlet tube passing through said closure, electrical terminals adjacent said humidifier tank, a reach of electrical cord connecting said terminals in circuit with the latter said heating element and motor and said cord being of sufficient length to accommodate removal of the said closure and the parts carried thereby, means to control a water level in said humidifier tank, a thermally insulated lid for said tank, electrical connections extending from said terminals to the first said heating element and motor, a column of screen bottomed egg trays supported within said incubation chamber, an upright sleeve centered on the screen bottom of each of said trays, said sleeves forming an air flue in the blow path of the first said fan, and exhaust ducts in said removable cover.

8. An incubator comprising a round sheet metal incubation chamber, multiple layers of corrugated paper wound around said incubation chamber, thermal insulation upon the bottom of said incubation chamber, a bottom cap member fitted over said thermal insulation and the lower portion of said corrugated paper and riveted to the bottom of said incubation chamber, a top band fitted around said corrugated paper, a top gasket mounted on the free edges of said corrugated paper, round egg trays fitting into said incubation chamber, means for supporting the bottom tray at a spaced distance above the floor of said incubation chamber, screen bottoms on each of said egg trays, a sleeve centrally mounted on the screen bottom of each of said egg trays, said sleeves forming a central air flue, a removable cover seating on said gasket, a motor driven fan centrally mounted on the underside of said cover, a thermostatically controlled heating element adjacent said fan, a humidifier mounted on the exterior of said cover, an air conduit leading from said humidifier and discharging adjacent said fan, an air inlet for said humidifier and exhaust ports for said incubation chamber.

9. In an incubator, having means to support a series of screen bottomed egg trays in a column, a sleeve mounted on each of the screen bottoms of said egg trays, said sleeves forming an air flue, a motor driven fan centered above said air flue, an air inlet adjacent said fan, exhaust ducts for said incubator, and means to maintain a constant temperature for incubation.

10. In an incubator having means for supporting eggs and means for recirculating air repeatedly between the eggs and means to maintain such air at constant temperature for incubation and means for gradually venting such air; a thermally insulated tank communicating with said incubator and thermally insulated therefrom, means to control a water level in said tank, an upright sleeve supported entirely within said tank, a motor mounted in said sleeve, a fan turned by said motor, a cupped disc turned by said motor and mounted in the path of said fan, a hollow cone having a cupped flange complementary to said disc and held in spaced relation thereto, an inner cone secured to said cupped disc and in spaced relation with said hollow cone, means to maintain said tank at a constant temperature sufficiently below that of the aforesaid constant temperature for incubation to provide saturated air containing the required weight of water to produce a predetermined percentage of relative humidity when raised to the aforesaid constant temperature for incubation, and an inlet tube for admitting air to said tank.

11. In an incubator having means for supporting eggs and means for recirculating air repeatedly between the eggs and means to maintain such air at constant temperature for incubation and means for gradually venting such air; a thermally insulated tank communicating with said incubator and thermally insulated therefrom, means to control a water level in said tank, an upright sleeve supported entirely within said tank, a motor mounted in said sleeve, a fan turned by said motor, a disc turned by said motor and mounted in the path of said fan, a hollow cone having a flange complementary to said disc and held in spaced relation thereto, means to maintain said tank at a constant temperature sufficiently below that of the aforesaid constant temperature for incubation to provide saturated air containing the required weight of water to produce a predetermined percentage of relative humidity when raised to the aforesaid constant temperature for incubation, and an inlet tube for admitting air to said tank.

12. An incubator comprising an incubation chamber having an air outlet, means to maintain the air in said incubation chamber at a constant temperature, a humidifier communicating with said incubation chamber and having an air inlet open to atmosphere, means to provide a flow of air first through said humidifier and then through said incubation chamber, means to maintain a constantly uniform spray of free moisture within said humidifier, means to produce repeated recirculations of the air and free moisture during the air flow through said humidifier, and means to repeatedly reheat the circulating moisture and air to a predetermined constant temperature during the recirculations within said humidifier.

13. An incubator comprising an incubation chamber having an air outlet, means to maintain the air in said incubation chamber at a constant temperature, a humidifier communicating with said incubation chamber and having an air inlet open to atmosphere, means to provide a flow of air first through said humidifier and then through said incubation chamber, a heating element within said humidifier, a thermostat within said humidifier and controlling said heating element, means to maintain a constantly uniform spray of moisture within said humidifier, means to recirculate the moisture spray and air repeatedly in contact with said thermostat and said heating element to promote saturation of the air with moisture at a constant temperature.

14. An incubator comprising an incubation chamber having an air outlet, means to maintain the air in said incubation chamber at a constant temperature, a humidifier communicating with said incubation chamber and having an air inlet, means to provide a flow of air from said humidifier to said incubation chamber, a thermostatically controlled heating element within said humidifier, means to maintain a constantly uniform spray of moisture within said humidifier, and means to pass the air from said inlet repeatedly through said moisture spray and to subject such air to said thermostatically controlled heating element each time the air is passed through said moisture spray.

DONALD F. IHLER.